(12) United States Patent
Lang et al.

(10) Patent No.: US 7,079,017 B2
(45) Date of Patent: Jul. 18, 2006

(54) WARNING DEVICE IN MOTOR VEHICLES

(75) Inventors: Heinrich Lang, Ergersheim (DE); Michael Witzke, Ansbach (DE); Jaap-Jan Snel, Bad Windsheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 501 days.

(21) Appl. No.: 10/103,182

(22) Filed: Mar. 21, 2002

(65) Prior Publication Data

US 2005/0007244 A1    Jan. 13, 2005

(30) Foreign Application Priority Data

Apr. 23, 2001 (DE) ............................. 201 06 977

(51) Int. Cl.
*B60Q 1/00* (2006.01)
(52) U.S. Cl. ................ 340/435; 340/436; 340/437; 340/691.6; 340/932.2
(58) Field of Classification Search ........... 340/435, 340/436, 437, 438, 903
See application file for complete search history.

(56) References Cited

U.S. PATENT DOCUMENTS

| | | |
|---|---|---|
| 809,698 A | 1/1906 | Kelley |
| 1,528,082 A | 3/1925 | Schlaich |
| 1,849,708 A | 3/1932 | Colbert et al. |
| 1,884,759 A | 10/1932 | Hodny |
| 1,908,767 A | 5/1933 | La Hodny |
| D092,937 S | 7/1934 | Vail |
| 2,060,401 A | 11/1936 | Smith |
| 2,161,777 A | 6/1939 | Sarnes |
| 2,166,303 A | 7/1939 | La Hodny et al. |
| 2,180,610 A | 11/1939 | Ritz-Woller |
| 2,190,123 A | 2/1940 | Pace |
| 2,263,382 A | 11/1941 | Gotzinger |
| 2,511,971 A | 6/1950 | Dalton |
| 2,561,582 A | 7/1951 | Marbel |
| 2,580,014 A | 12/1951 | Gazda |
| 2,595,331 A | 5/1952 | Calihan et al. |
| 2,693,589 A | 11/1954 | Hopkins |
| 3,040,207 A | 6/1962 | Grontkowski |
| 3,107,077 A | 10/1963 | Lassa |
| 3,189,309 A | 6/1965 | Hager |
| 3,266,016 A | 8/1966 | Maruyama et al. |
| 3,317,906 A | 5/1967 | Baldridge |
| 3,372,897 A | 3/1968 | Lee |
| 3,375,053 A | 3/1968 | Ward |
| 3,424,517 A | 1/1969 | Budreck |
| 3,436,758 A | 4/1969 | Kluth |
| 3,476,464 A | 11/1969 | Clark |

(Continued)

FOREIGN PATENT DOCUMENTS

DE    3044614 A    7/1982

(Continued)

OTHER PUBLICATIONS

English Language Abstract for JP 1164638A, Derwent Info. Ltd. (c) 2002.

(Continued)

*Primary Examiner*—Benjamin C. Lee
*Assistant Examiner*—Son Tang
(74) *Attorney, Agent, or Firm*—McNair Law Firm, P.A.

(57) ABSTRACT

A warning system for a vehicle is provided. The warning system has a sensor for detecting an obstruction near the vehicle, a control apparatus to produce a signal in response to the detected obstruction, and an alert device configured to direct a driver's attention to the obstruction.

12 Claims, 2 Drawing Sheets

U.S. PATENT DOCUMENTS

| | | |
|---|---|---|
| 3,574,283 A | 4/1971 | Albers |
| 3,609,014 A | 9/1971 | Kurz, Jr. |
| 3,642,344 A | 2/1972 | Corker |
| 3,659,929 A | 5/1972 | Yuzawa |
| 3,662,328 A | 5/1972 | Spivak |
| 3,665,392 A | 5/1972 | Annas |
| 3,761,164 A | 9/1973 | Mckee et al. |
| 3,790,748 A | 2/1974 | Van Laethem et al. |
| 3,811,715 A | 5/1974 | Brudy |
| 3,840,851 A | 10/1974 | Fowler |
| 3,916,549 A | 11/1975 | Storch et al. |
| 3,936,158 A | 2/1976 | Cianciolo et al. |
| 3,950,080 A | 4/1976 | McKee et al. |
| 3,969,952 A | 7/1976 | McKee et al. |
| 3,979,158 A | 9/1976 | Yamashita et al. |
| 4,005,928 A | 2/1977 | Kmetz et al. |
| 4,013,353 A | 3/1977 | Portner et al. |
| 4,023,029 A | 5/1977 | Fischer |
| 4,040,726 A | 8/1977 | Paca |
| 4,066,332 A | 1/1978 | Kato et al. |
| 4,076,392 A | 2/1978 | Suzuki et al. |
| 4,109,235 A | 8/1978 | Bouthors |
| 4,167,113 A | 9/1979 | Mann |
| 4,174,823 A | 11/1979 | Sutton et al. |
| 4,197,762 A | 4/1980 | Yamana |
| 4,210,357 A | 7/1980 | Adachi |
| 4,229,992 A | 10/1980 | McKee et al. |
| 4,267,494 A | 5/1981 | Matsuoka et al. |
| 4,274,078 A | 6/1981 | Isobe et al. |
| 4,281,899 A | 8/1981 | Oskam |
| 4,293,947 A | 10/1981 | Brittain |
| 4,299,444 A | 11/1981 | Römer |
| 4,340,646 A | 7/1982 | Ohno et al. |
| 4,348,556 A | 9/1982 | Gettig et al. |
| 4,349,247 A | 9/1982 | Koyama et al. |
| 4,425,717 A | 1/1984 | Marcus |
| 4,436,372 A | 3/1984 | Schmidt et al. |
| 4,443,057 A | 4/1984 | Bauer et al. |
| 4,464,017 A | 8/1984 | Wada |
| 4,475,100 A | 10/1984 | Duh |
| 4,477,199 A | 10/1984 | Manzoni |
| 4,479,172 A | 10/1984 | Connor |
| 4,488,778 A | 12/1984 | Polzer et al. |
| 4,491,390 A | 1/1985 | Tong-Shen |
| 4,499,451 A | 2/1985 | Suzuki et al. |
| 4,506,954 A | 3/1985 | Enomoto |
| 4,555,166 A | 11/1985 | Enomoto |
| 4,572,626 A | 2/1986 | Suzuki |
| 4,583,155 A | 4/1986 | Hart |
| 4,588,267 A | 5/1986 | Pastore |
| 4,591,954 A | 5/1986 | Kawamura et al. |
| 4,603,946 A | 8/1986 | Kato et al. |
| 4,609,265 A | 9/1986 | McKee et al. |
| 4,613,791 A | 9/1986 | Kurihara et al. |
| 4,623,222 A | 11/1986 | Itoh et al. |
| 4,625,210 A | 11/1986 | Sagl |
| 4,626,063 A | 12/1986 | Honey |
| 4,626,967 A | 12/1986 | Segoshi |
| 4,630,904 A | 12/1986 | Pastore |
| 4,645,970 A | 2/1987 | Murphy |
| 4,646,210 A | 2/1987 | Skogler et al. |
| 4,659,967 A | 4/1987 | Dahl |
| D289,989 S | 5/1987 | Skogler et al. |
| 4,663,869 A | 5/1987 | Nakagawa |
| 4,665,321 A | 5/1987 | Chang et al. |
| 4,678,294 A | 7/1987 | Van Nostrand |
| 4,678,295 A | 7/1987 | Fisher |
| 4,679,158 A | 7/1987 | Tate |
| 4,694,295 A | 9/1987 | Miller et al. |
| 4,696,555 A | 9/1987 | Enomoto |
| 4,698,464 A | 10/1987 | Tanaka et al. |
| 4,701,022 A | 10/1987 | Jacob |
| 4,701,037 A | 10/1987 | Bramer |
| 4,706,194 A | 11/1987 | Webb et al. |
| RE32,576 E | 1/1988 | Pastore |
| 4,733,335 A | 3/1988 | Serizawa et al. |
| 4,733,336 A | 3/1988 | Skogler et al. |
| 4,764,004 A | 8/1988 | Yamada et al. |
| 4,786,156 A | 11/1988 | Kotani et al. |
| 4,787,726 A | 11/1988 | Hendricks |
| 4,791,534 A | 12/1988 | Lindberg |
| 4,793,690 A | 12/1988 | Gahan et al. |
| 4,798,967 A | 1/1989 | Yamana et al. |
| 4,799,768 A | 1/1989 | Gahan |
| 4,807,096 A | 2/1989 | Skogler et al. |
| 4,809,137 A | 2/1989 | Yamada |
| 4,809,561 A | 3/1989 | Tsuyama |
| 4,816,662 A | 3/1989 | Kyoden |
| 4,818,090 A | 4/1989 | Righi |
| 4,830,326 A | 5/1989 | Schmidt et al. |
| 4,833,376 A | 5/1989 | Shimura |
| 4,841,198 A | 6/1989 | Wilhelm |
| 4,867,408 A | 9/1989 | Ozaki |
| 4,868,459 A | 9/1989 | Dennerlein et al. |
| 4,868,719 A | 9/1989 | Kouchi et al. |
| 4,878,743 A | 11/1989 | Aikawa et al. |
| 4,882,565 A | 11/1989 | Gallmeyer |
| 4,883,349 A | 11/1989 | Mittelhäuser |
| 4,886,960 A | 12/1989 | Molyneux et al. |
| 4,890,909 A | 1/1990 | Schmidt et al. |
| 4,893,063 A | 1/1990 | Pernyeszi |
| 4,896,030 A | 1/1990 | Miyaji |
| 4,907,222 A | 3/1990 | Slavik |
| 4,915,493 A | 4/1990 | Fisher et al. |
| 4,916,430 A | 4/1990 | Vu et al. |
| 4,917,477 A | 4/1990 | Bechtel et al. |
| 4,919,526 A | 4/1990 | Umekawa et al. |
| 4,929,866 A | 5/1990 | Murata et al. |
| 4,930,370 A | 6/1990 | Yoshida |
| 4,935,665 A | 6/1990 | Murata |
| 4,937,402 A | 6/1990 | Kyoden |
| 4,937,796 A * | 6/1990 | Tendler ..................... 367/116 |
| 4,938,577 A | 7/1990 | Sugita |
| 4,940,322 A | 7/1990 | Hamamoto et al. |
| 4,940,964 A | 7/1990 | Dao |
| 4,942,571 A | 7/1990 | Möller et al. |
| 4,951,179 A | 8/1990 | Machida |
| 4,955,704 A | 9/1990 | Janowicz |
| 4,988,178 A | 1/1991 | Eifert |
| D315,710 S | 3/1991 | Ropolo |
| 4,998,814 A | 3/1991 | Perry |
| 5,005,009 A | 4/1991 | Roberts |
| 5,015,824 A | 5/1991 | Monter et al. |
| 5,044,739 A | 9/1991 | do Espirito Santo |
| 5,050,051 A | 9/1991 | Machida et al. |
| 5,056,905 A | 10/1991 | Jensen |
| 5,059,015 A | 10/1991 | Tran |
| 5,072,340 A | 12/1991 | Jones |
| 5,082,361 A | 1/1992 | McKee |
| 5,093,768 A | 3/1992 | Ohe |
| 5,097,362 A | 3/1992 | Lynas |
| 5,110,196 A | 5/1992 | Lang et al. |
| 5,115,352 A | 5/1992 | do Espirito Santo |
| 5,126,885 A | 6/1992 | Gray |
| 5,128,659 A | 7/1992 | Roberts et al. |
| 5,132,851 A | 7/1992 | Bomar et al. |
| 5,148,327 A | 9/1992 | Gaxiola, Jr. |
| 5,151,563 A | 9/1992 | Tanaka |
| 5,151,824 A | 9/1992 | O'Farrell |
| H001109 H | 10/1992 | Roberts et al. |
| 5,165,772 A | 11/1992 | Wu |
| 5,174,649 A | 12/1992 | Alston |
| 5,175,926 A | 1/1993 | Chapman |
| 5,196,965 A | 3/1993 | Lang et al. |

| | | |
|---|---|---|
| 5,211,466 A | 5/1993 | Jarocki et al. |
| 5,212,467 A | 5/1993 | Park |
| 5,225,943 A | 7/1993 | Lupo |
| 5,226,034 A | 7/1993 | Nagayama et al. |
| 5,227,924 A | 7/1993 | Kerper |
| 5,240,438 A | 8/1993 | Desranleau et al. |
| 5,241,457 A | 8/1993 | Sasajima et al. |
| 5,249,083 A | 9/1993 | Doughtie et al. |
| 5,253,115 A | 10/1993 | Ueno |
| 5,268,796 A | 12/1993 | Tomerlin et al. |
| 5,272,602 A | 12/1993 | Sasajima et al. |
| 5,274,505 A | 12/1993 | Nagayama et al. |
| 5,285,060 A | 2/1994 | Larson et al. |
| 5,289,321 A | 2/1994 | Secor |
| 5,303,130 A | 4/1994 | Wei et al. |
| 5,306,953 A | 4/1994 | Weiner |
| 5,325,096 A | 6/1994 | Pakett |
| 5,339,075 A | 8/1994 | Abst et al. |
| 5,343,333 A | 8/1994 | Nagayama et al. |
| 5,347,273 A * | 9/1994 | Katiraie ...................... 340/903 |
| 5,355,284 A | 10/1994 | Roberts |
| 5,361,190 A | 11/1994 | Roberts et al. |
| 5,363,246 A | 11/1994 | Perry et al. |
| D353,795 S | 12/1994 | Ayala |
| 5,371,659 A | 12/1994 | Pastrick et al. |
| 5,373,482 A * | 12/1994 | Gauthier ...................... 367/99 |
| 5,388,035 A | 2/1995 | Bodem, Jr. |
| 5,436,741 A | 7/1995 | Crandall |
| 5,436,769 A | 7/1995 | Gilbert et al. |
| 5,436,809 A | 7/1995 | Brassier et al. |
| 5,438,487 A | 8/1995 | Schmid et al. |
| 5,455,625 A | 10/1995 | Englander |
| 5,467,230 A | 11/1995 | Boddy et al. |
| 5,481,409 A | 1/1996 | Roberts |
| 5,491,470 A | 2/1996 | Veligdan |
| 5,497,275 A | 3/1996 | Perry et al. |
| 5,497,305 A | 3/1996 | Pastrick et al. |
| 5,497,306 A | 3/1996 | Pastrick |
| 5,508,689 A | 4/1996 | Rado et al. |
| 5,521,588 A | 5/1996 | Kühner et al. |
| 5,523,811 A | 6/1996 | Wada et al. |
| 5,528,217 A * | 6/1996 | Adams ...................... 340/435 |
| 5,530,240 A | 6/1996 | Larson et al. |
| 5,568,326 A | 10/1996 | Yoshida et al. |
| 5,570,127 A | 10/1996 | Schmidt |
| 5,574,443 A * | 11/1996 | Hsieh ...................... 340/901 |
| 3,291,435 A | 12/1996 | Herr |
| 5,583,495 A | 12/1996 | Ben Lulu |
| 5,587,699 A | 12/1996 | Faloon et al. |
| 5,604,644 A | 2/1997 | Lang et al. |
| 5,615,054 A | 3/1997 | Lang et al. |
| 5,631,638 A | 5/1997 | Kaspar et al. |
| 5,642,106 A | 6/1997 | Hancock et al. |
| 5,649,316 A | 7/1997 | Prudhomme et al. |
| 5,670,845 A | 9/1997 | Grant et al. |
| D385,243 S | 10/1997 | Lang |
| 5,677,979 A | 10/1997 | Squicciarini et al. |
| 5,680,123 A | 10/1997 | Lee |
| 5,696,776 A | 12/1997 | Spies et al. |
| 5,731,558 A | 3/1998 | Kyoden |
| 5,744,875 A | 4/1998 | Kleefeldt et al. |
| D394,833 S | 6/1998 | Muth |
| 5,786,772 A * | 7/1998 | Schofield et al. ........... 340/903 |
| D397,072 S | 8/1998 | Hellhake et al. |
| 5,788,357 A | 8/1998 | Muth et al. |
| 5,793,420 A | 8/1998 | Schmidt |
| 5,798,882 A | 8/1998 | Lang |
| 5,823,905 A | 10/1998 | Torii et al. |

| | | |
|---|---|---|
| 5,879,074 A | 3/1999 | Pastrick |
| D409,127 S | 5/1999 | Kim et al. |
| D409,540 S | 5/1999 | Muth |
| 5,912,616 A | 6/1999 | Valentino |
| 5,914,652 A * | 6/1999 | Adamo ...................... 340/436 |
| 5,953,168 A | 9/1999 | Valentino |
| 5,959,555 A * | 9/1999 | Furuta ...................... 340/937 |
| 5,963,127 A | 10/1999 | Lang et al. |
| 5,978,017 A | 11/1999 | Tino |
| 5,983,161 A | 11/1999 | Lemelson et al. |
| 6,006,143 A | 12/1999 | Bartel et al. |
| 6,019,475 A | 2/2000 | Lynam et al. |
| 6,030,084 A | 2/2000 | Schmidt |
| 6,045,243 A | 4/2000 | Muth et al. |
| D427,127 S | 6/2000 | Horowitz |
| D431,508 S | 10/2000 | Matsumoto et al. |
| 6,163,338 A | 12/2000 | Johnson et al. |
| 6,217,181 B1 | 4/2001 | Lynam et al. |
| 6,222,447 B1 | 4/2001 | Schofield et al. |
| 6,268,803 B1 * | 7/2001 | Gunderson et al. ......... 340/903 |
| 6,281,786 B1 * | 8/2001 | Adachi et al. ............... 340/435 |
| 6,337,638 B1 * | 1/2002 | Bates et al. .................. 340/904 |
| 6,349,916 B1 | 2/2002 | Lang et al. |
| 6,363,326 B1 * | 3/2002 | Scully ......................... 701/301 |
| 6,424,273 B1 * | 7/2002 | Gutta et al. .................. 340/937 |
| 6,476,730 B1 * | 11/2002 | Kakinami et al. ....... 340/932.2 |
| 6,542,085 B1 * | 4/2003 | Yang .......................... 340/903 |
| 6,642,840 B1 * | 11/2003 | Lang et al. .................. 340/435 |
| 6,693,524 B1 * | 2/2004 | Payne ......................... 340/463 |
| 6,720,868 B1 * | 4/2004 | Flick ........................... 340/435 |
| 6,753,766 B1 * | 6/2004 | Patchell ...................... 340/436 |
| 6,995,687 B1 * | 2/2006 | Lang et al. .............. 340/932.2 |
| 2002/0017985 A1 * | 2/2002 | Schofield et al. ........... 340/436 |

FOREIGN PATENT DOCUMENTS

| | | |
|---|---|---|
| DE | 8905801.1 | 7/1989 |
| DE | 4204053 A | 8/1992 |
| DE | 4432589 A1 | 3/1996 |
| DE | 19921449 | 1/2001 |
| EP | 0591743 A1 | 4/1994 |
| EP | 0761502 B1 | 7/1996 |
| EP | 0370965 A2 | 5/1999 |
| EP | 1068992 | 1/2001 |
| GB | 2041857 A | 9/1980 |
| GB | 2335898 | 10/1999 |
| GB | 2350 741 A | 12/2000 |
| JP | 1164638 A | 6/1989 |
| WO | WO 9523079 | 8/1995 |
| WO | WO 9525322 | 9/1995 |
| WO | WO 98/34131 A1 | 8/1998 |

OTHER PUBLICATIONS

English Language translation of DE 8905801.1.
English Language Abstract for DE 44 32 589 A1, Derwent Info. Ltd. (c) 1999.
U.S. Appl. No. 09/304,001, filed 4/30/1999.
English Language Abstract for EP 1068992, Derwent Info. Ltd. (c) 2002.
English Language translation of DE 199 21 449.
German Search Report dated Apr. 23, 2001.
English Language translation dated Sep. 29, 2001 of German Search Report.
European Search Report dated Sep. 17, 2002.

* cited by examiner

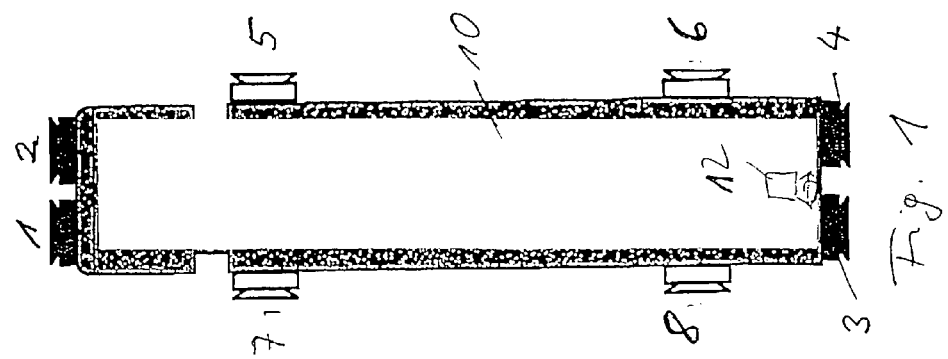
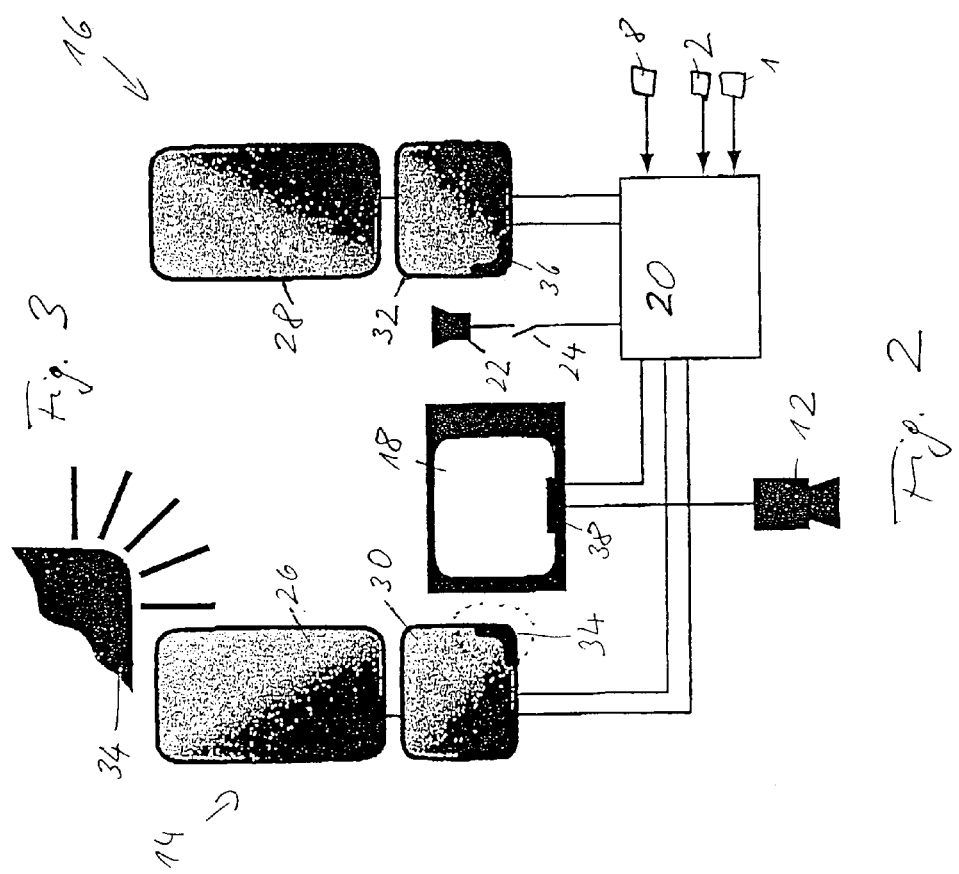

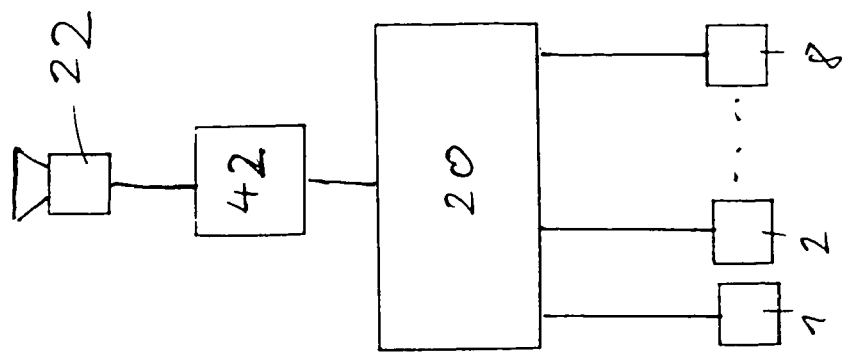
Fig. 5
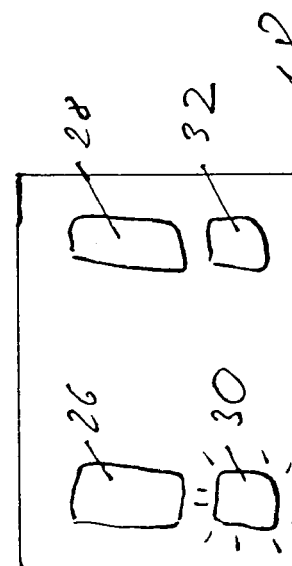
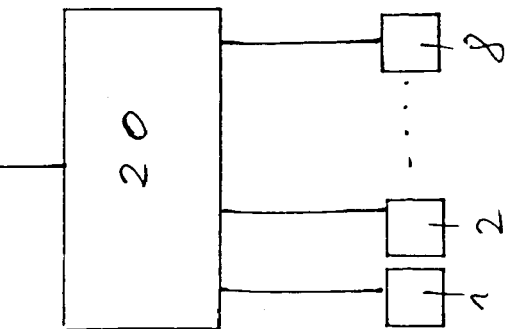
Fig. 4

WARNING DEVICE IN MOTOR VEHICLES

DESCRIPTION

The invention concerns a warning device in motor vehicles, in accord with the generic concept of Claim 1.

In recent times, motor vehicles have been equipped with a multitude of warning and monitoring apparatuses. For instance, EP 1 068 992 A2 has disclosed a backing-up assistance for vehicles, by means of which the location and the size of an obstruction behind a motor vehicle can be determined and the driver informed thereof.

The sensors employed for this system are based on ultrasonics, infrared, radar and detection by means of electromagnetic radiation. In the case of commercial vehicles, such sensors were not only installed at the rear of the vehicles, but also on the sides and the fronts thereof This is done so that those areas, which are not immediately within the visual range of the driver, i.e. blind zones at the front, rear and the sides of the vehicle, are monitored and in case an obstruction appears in these areas a warning signal can be produced. Normally, an acoustic warning signal signals to the driver that a an obstruction lies before, behind or at the side of his vehicle. The driver must now look at his various display apparatuses in the outside mirrors and/or at a monitor responding to a camera in the rear area, to determine where the subject of the signal is located. In doing this, valuable time is lost, within which period an accident can occur. Additionally the danger is present, that the driver generally can't determine just where the obstruction is to be found.

It is thus the purpose of the present invention to so improve the aforesaid warning apparatuses, that the location and the position of the subject obstruction is more easily made known to the driver.

The achievement of this purpose will be accomplished by the features of Claim 1.

If an obstruction is detected, by means of one or more of the sensors, which find their place on the sides, rear and/or on the forward part of the motor vehicle, then a control apparatus, which is associated with said sensors, advises the driver as to which specific display apparatus out of the multitude of display apparatuses his attention should be directed. By a glance on this selected display apparatus, for instance, on the left outside mirror, the driver can discern the detected obstruction which was detected by one of the sensors. Alternatively, the produced advisory signal indicates directly the location of the detected obstruction. The driver receives, not so much just a inconclusive acoustic signal, which indicates an obstruction, wherever it may be, as this is the case in accord with the state of the technology. Contrarily, by the signal in accord with the invention, this being either optical and/or acoustic, the driver is informed as to the exact location of the detected obstruction and he can thus act more quickly and in a considered manner. Additionally this leads also to an avoidance of stress situations for the driver, since he essentially more rapidly, i.e. immediately, knows where the detected obstruction is to be found.

In the case of the display equipment in accord with the present invention, the primary concern embraces the outside mirror on the motor vehicle, which, in the case of trucks or larger commercial vehicles, is a main mirror and, at the least, is accompanied by a wide angle mirror.

The wide angle mirror allows recognition of obstructions both to the side as well as to the front of the vehicle, which are not directly immediately visible in the main mirror, since they are in the "dead angle" of reflected images.

Additionally, the display apparatuses, in accord with the present invention, include monitors for supervisory cameras, LED/LDC modules and the like (Claim 2).

In accord with an advantageous embodiment of the invention, Claim 3 describes a means for optical display of the advisory signals produced by the control apparatus. In this case, fortunately, (Claim 4) a plurality of display means are provided, which respectively are spatially linked with that display apparatus through which the detected obstruction is visible. If, for instance, an obstruction is detected by a sensor on the left side of the vehicle, then there will appear in the wide angle mirror on the left driver's side a blinking signal (Claim 5), which alerts the driver that, in this mirror, that is, in this display apparatus, that obstruction is visible, which was detected by the sensor (Claim 6).

In accord with a further advantageous embodiment of the invention, instead of a blink signal, or in addition to the blink signal, an advisory text can be displayed, which indicates the location of the obstruction which was picked up by the sensor.

In accord with a further advantageous embodiment of the invention, as seen in Claim 7, provision can be made for an acoustic means for the emitting of an acoustic warning signal of the obstruction detected by the sensors. In the case of this acoustic means, the alarm can by produced and emitted by a loud speaker or peep-signal, as this is already known in the state of the technology. Additionally it is also possible, that, according to the location of the detected obstruction in relation to the vehicle, different tones, i.e., peep-signals of varied pitch or with different sound patterns can be produced and emitted.

In accord with a further advantageous embodiment of the invention, as indicated by Claim 8, a speech emitting device is provided, by means of which the location of an obstruction detected by the sensors is made known by spoken word. By means of this spoken word, first, the information can be given, that an obstruction is to be found on left side of the driver and additionally, the information can be added, that the obstruction is recognizable in the left outside rearview mirror or certainly in the wide angle mirror.

The remaining subordinate claims concern themselves with further advantageous embodiments of the invention.

Further details, features and advantages of the invention arise from the following description of a preferred embodiment, with the air of the drawing. There is shown in:

FIG. 1 a schematic presentation of the arrangement of a plurality of sensors around a vehicle, FIG. 2 a schematic presentation of a first embodiment of the invention, FIG. 3 a detail from FIG. 2, FIG. 4 a schematic presentation of a second embodiment of the invention, and FIG. 5 A schematic presentation of a third embodiment of the invention.

FIG. 1 shows, schematically, an example arrangement of sensors 1 to 8 on a motor vehicle 10, that is, a truck, for the detection of obstructions. In this case, the first and second sensors, 1 and 2 are on the forward end of the vehicle for the detection of obstructions directly in front of said vehicle. The third and fourth sensors 3 and 4, are on the rear of the vehicle 10, for the detection of obstruction behind the vehicle. The fifth and sixth sensors 5, 6, are found on the right side of the vehicle for the detection of obstructions to the right of the vehicle 10. The seventh and eighth sensors 7, 8 are on the left side of the vehicle for the detection of obstructions on that side. Additionally, a backing-up camera is 12 is provided, by means of which the sector in the rear of the vehicle 10 can be directly supervised.

FIG. 2 shows schematically a first embodiment of the invention with a plurality of display devices in the for of a left outside mirror 14, a right outside mirror 16 as well as a monitor 18. The right and left outside mirror arrangements 14, 16 and the monitor 18 are connected to a control apparatus 20. The control apparatus 20, in turn, is connected with the sensors 1 to 8. The control unit 20 is additionally connected with a loudspeaker 22 for the emitting of an acoustic warning signal. The loudspeaker 22 can be deactivated by means of a switch 24. The left, as well as the right, outside mirror arrangement 14, 16, possesses respectively a main mirror 26, 28 and a wide angle mirror 30, 32.

In the right, lower corner of the left wide angle mirror 30 is provided a first LED-element 34, which would serve for the optical display of the advisory signal produced by the control apparatus 20, in case the sensors 7 or 8 detect an obstruction on the left side of the vehicle. In such a case, the first LED element 34 blinks, as this is shown in FIG. 3, when the sensors 7 and 8 detect an obstruction. In an analogous manner, in the left, lower corner of the right wide angle mirror 32, a second LED-element 36 is provided, which blinks, when the sensors 5 and 6 on the right side of the vehicle 10 detect an obstruction. A third LED-element 38 is in the area of the under edge of the monitor 18. The third LED-element 38 blinks, when the sensors 3 and 4, on the rear of the vehicle 10 detect an obstruction. If, by means of the first sensor 1 of the left forward end of the vehicle 10 detects an obstruction, then the first LED-element blinks in the left wide angle mirror 30. If, by means of the second sensor 2, an obstruction is found on the right forward end of the vehicle 10, then the second LED-element 36 in the right wide angle mirror 32 blinks. Additionally, upon the detection of an obstruction, by means of any of the sensors 1 to 8, an acoustic warning signal will be generated and emitted by the loud speaker 22.

By means of the spatial arrangement of the LED-elements 34, 36 and 38 to the respective display apparatus, i.e. left wide angle mirror 30, right wide angle mirror 32, or monitor 18, the attention of the driver is directed to the respective blinking LED-element 34, 36 or 38 on the corresponding display apparatus, in which the detected obstruction should be seen. Thereby, the driver can correspondingly react without delay.

FIG. 4 shows, schematically, a second embodiment of the invention, in which, on the monitor 18 are shown in stylized manner, the individual display apparatuses, that is, the left and right outside mirror arrangements 14 and 16, with the main mirrors, respectively 26 and 28, and with the wide angle mirrors, likewise, 30 and 32. Should now, for example, the seventh sensor 7 detect an obstruction, then, on the monitor 18, the stylized image of the left wide angle mirror 10 blinks, and the driver of the vehicle 10 is thereby apprised, that the detected obstruction is to be seen in the left wide angle mirror 30 of the left outside mirror 14 assembly. If an obstruction is detected by the third of fourth sensor on the rear of the vehicle 10, then the stylized presentation of the left and right outside mirror arrangements 14 and 16 are extinguished. In the monitor 18, a marking element on the under edge thereof illuminates or blinks. Thereby the driver is given notice, that the detected obstruction is to be seen on the monitor 18.

Additionally, or alternatively, the marking element 40 on the monitor 18 can be designed as a text display, in which written notice is to be given relative to which location of the vehicle 10 a detected obstruction is to be found, for instance, in the form of a brief text, "Obstruction in the area of the right driver door".

FIG. 5 shows schematically a third embodiment of the invention, in which the advisory signal produced by the control apparatus 20 is spoken over the loudspeaker 22 as a vocal statement, such as "Obstruction in the area of the left driver side". In this case a voice module 42 is inserted between the control apparatus 20 and the loudspeaker 22.

Also, combinations of the three differing embodiments among one another are possible.

REFERENCE NUMBERS

1–8 sensors
10 vehicle, motor vehicle, generally referring to a commercial vehicle
12 backing-up camera
14 left outside mirror assembly
16 right outside mirror assembly
18 monitor
20 control apparatus
22 loudspeaker
24 switch
26 left main mirror
28 right main mirror
30 left wide angle mirror
32 right wide angle mirror
34 first LED-element
36 second LED-element
38 third LED-element
40 marking element
42 voice emission module

The invention claimed is:

1. A warning system for vehicles having a plurality of sensors, at least one of the sensors located about each of a front, a rear, a left side and a right side of the vehicle, the sensors being configured to detect a presence of an obstruction and produce an obstruction signal, the warning system comprising:
   a plurality of display devices including a pair of mirrors and a monitor affixed to the vehicle and located in a field of regard of a driver of the vehicle;
   a control apparatus in communication with the sensors, the control apparatus configured to deliver an advisory signal to selected ones of said display devices in response to the obstruction signal from at least one of said sensors detecting the obstruction;
   an alert device including a liquid crystal display (LCD) on the monitor and an acoustic device having a voice module configured to verbally alert the driver in communication with the control apparatus responsive to the advisory to the advisory signal, the LCD configured to display a text message to alert the driver of the detected obstruction displayed in said display devices in response to the signal from the control apparatus.

2. The warning system of claim 1, wherein one of said sensors is an ultrasonic sensor.

3. The warning system of claim 1, wherein at least one of said sensors is an electromagnetic sensor.

4. The warning system of claim 3, wherein the electromagnetic sensor is selected from the group consisting of an infrared sensor, an ultraviolet sensor, a laser, a radar and combinations thereof.

5. The warning system of claim 1, wherein the alert device is disposed proximate the display device.

6. The warning system of claim 1, wherein the acoustic module is in communication with a loudspeaker configured to amplify the verbal alert, the loudspeaker further configured to be selectively energized by the driver.

7. A monitoring system for a vehicle comprising:
sensor disposed on the vehicle sides, front and rear, the sensors configured to sense an obstruction located in front, and in rear of the vehicle;
a control apparatus in communication with the sensor, the control apparatus configured to produce an advisory signal in response to an obstruction signal from any one of the sensors;
a display device attached to the vehicle and disposed in a field of regard of a driver of the vehicle; said display device including a monitor displaying images of mirrors that are arranged apart from each other; and
said images of mirrors include at least one wide-angle mirror image and at least one main mirror image, the at least one wide-angle mirror image and the at least one main mirror image disposed proximate each other;
an alert device responsive to the advisory signal, configured to attract attention of the driver of the vehicle to the monitor when only the monitor displaying the sensed obstruction and to the monitor and mirror images when the monitor and mirror images are displaying the obstruction.

8. The warning system of claim 7, wherein the alert device includes an audio device configured to acoustically alert the driver of the detected object.

9. The warning system of claim 8, wherein the audio device is selected from the group consisting of a voice module, a horn, a siren, a buzzer, a bell, a whistle, and combinations thereof.

10. The warning system of claim 7, wherein the plurality of sensors is selected from the group consisting of ultrasonic sensors, electromagnetic sensors, cameras, and combinations thereof.

11. The monitoring system of claim 7, wherein the at least one sensor is an electromagnetic sensor.

12. The monitoring system of claim 11, wherein the electromagnetic sensor is a camera disposed on a rear of the vehicle, the camera configured to be selectively energized when the vehicle is moving in a reverse direction.

* * * * *